May 19, 1970     D. D. McCORKLE     3,512,605

STEREO SPEAKER HEADREST FOR AN AUTOMOBILE SEAT

Filed Aug. 31, 1967     2 Sheets-Sheet 1

INVENTOR
DAVID D. McCORKLE

BY *Sughrue, Rothwell, Mion, Zinn & Macpeak*

ATTORNEYS

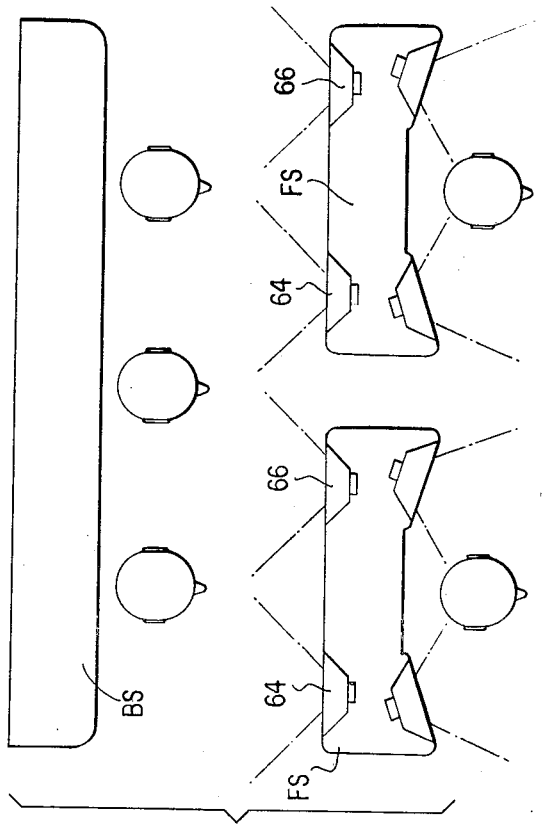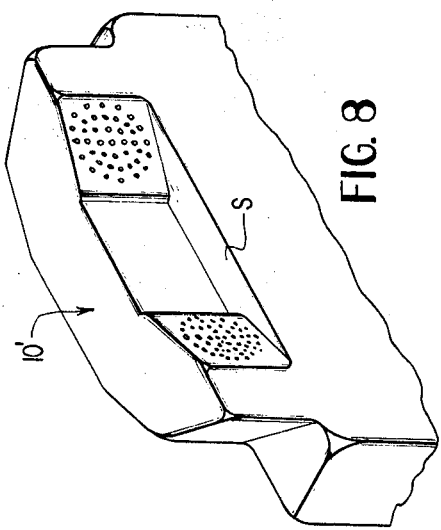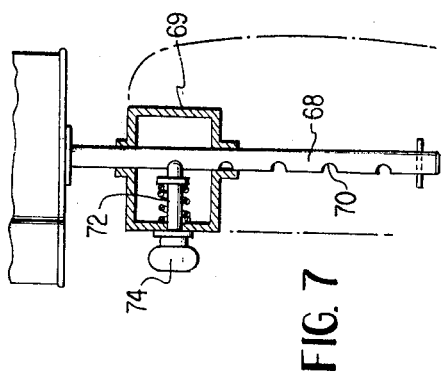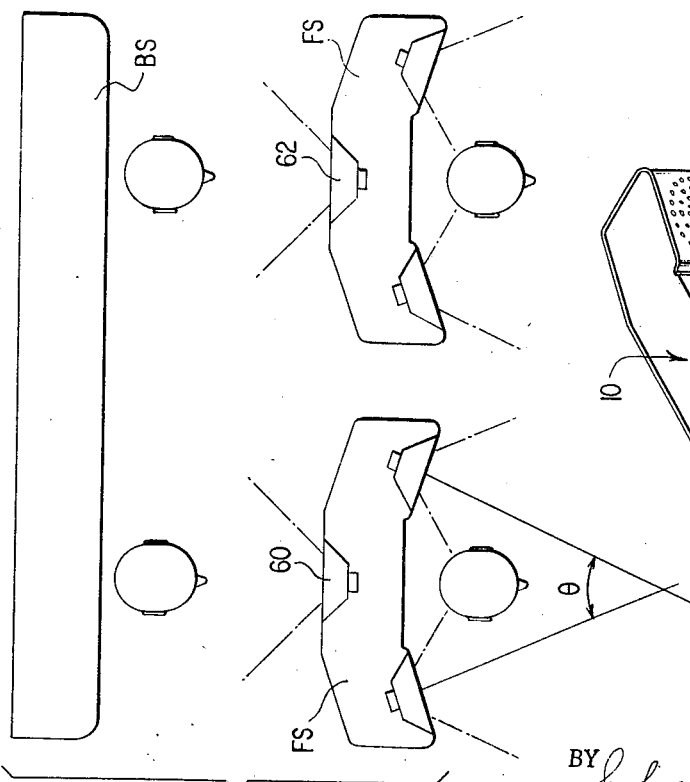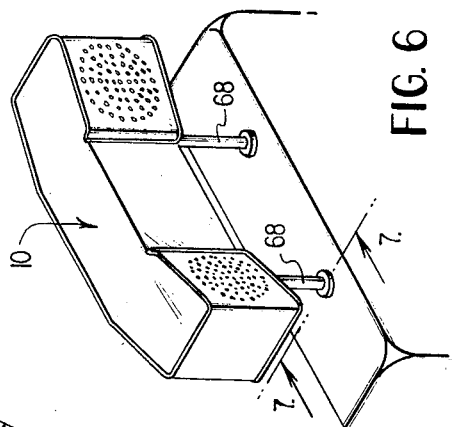
INVENTOR
DAVID D. McCORKLE

United States Patent Office 3,512,605
Patented May 19, 1970

3,512,605
STEREO SPEAKER HEADREST FOR AN
AUTOMOBILE SEAT
David D. McCorkle, 26440 Westphal Drive,
Dearborn Heights, Mich. 48127
Filed Aug. 31, 1967, Ser. No. 664,699
Int. Cl. H04r 5/02; H04m 1/11; A47c 7/72
U.S. Cl. 181—31                                              2 Claims

ABSTRACT OF THE DISCLOSURE

A padded headrest which has forwardly extending side wing portions, each of which carries a speaker of an audio reproduction system. The headrest may be integral with a seat or separate therefrom, or mounted on brackets. Additional speakers in the headrest may face rearwardly. This unique conception is a combination sound system and safety device designed to be attached to a stationary, reclining or moving instrument, e.g., theater seat, reclining chair, automobile seat, airplane, bus, etc.

BACKGROUND OF INVENTION

Field of invention

This invention relates to an improvement in the method of sound reproduction, this improved method being implemented by the use of a headrest incorporating speakers in side wing portions thereof.

Prior art

It is known in the prior art to provide headrests for seats with speakers in wing portions thereof. It is also known in the art to provide stereo systems for automobiles with multiple speakers for the front and rear seats. However, the speaker headrests of the prior art were not capable of the superior audio reproduction characteristics embodied in the present unique design due to the poor positioning of the speakers. The stereo speaker systems for automobiles included separate speakers for both the front and rear of the passenger compartment which were expensive to install and did not provide accurate reproduction into listeners' ears.

SUMMARY OF INVENTION

This invention provides a padded headrest with a central back portion and side wing portions extending at a predetermined angle thereto so that sound from speakers mounted in the wing portions is directed to the ears of a listener in the seat. Each speaker is backed by an acoustical restriction, such as an acoustical chamber. Speakers for both front and rear seats of the car can be incorporated in the same headrest facing both directions. In automotive applications a bracket mounting the headrest adapts to standard automobile seats or a headrest incorporating the features of this invention can be built into the top and back of a front automobile seat to provide safety as well as entertainment for the passengers.

BRIEF DESCRIPTION OF THE DRAWINGS

FIG. 4 is a diagrammatic plan view of the arrangement of the stereo speakers incorporated in the headrest of this invention with relation to the front and back seats of an automobile when the stereo speaker system is applied to same.

FIG. 5 is a diagrammatic plan view similar to FIG. 4 of another embodiment.

FIG. 6 is a front perspective view of a stereo headrest having a modified mounting bracket.

FIG. 7 is a sectional view taken along line 7—7 of FIG. 6.

FIG. 8 is a perspective view of another embodiment of the headrest of this invention.

DESCRIPTION OF PREFERRED EMBODIMENTS

Figure 1:
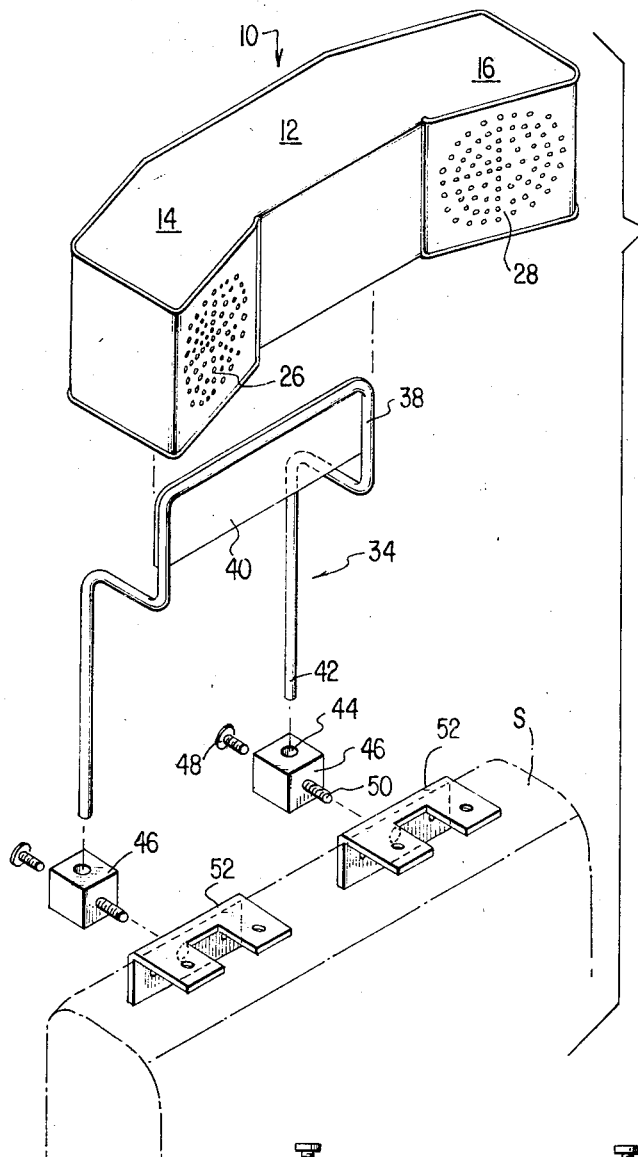
FIG. 1 is an exploded perspective of the stereo speaker headrest of this invention.

Referring to the drawings, a headrest 10 is of the general type to provide support for the head of a driver or passengers seated in automobile seats, such as seat S. The safety value of such headrests are well known and they have been widely recognized for their contributions to the prevention of whiplash injuries and the like.

The headrest of this invention includes a central back portion 12 and a pair of forwardly extending side wing portions 14 and 16. The front portion of the side wings extends at an angle of about 30 to 35° to the front surface of the central back portion 12.

The interior of the headrest 10 includes padding 18 of a known type for shock absorbing purposes which padding is covered with a suitable cover 20 which may be vinyl or the like. Speakers 22 and 24 are mounted in the wing portions 16 and 14 respectively. These speakers are of a conventional type used in the production of audio sound and are connected by electrical connectors and conductors (not shown) to a record player, a tape play back, AM or FM radio, any of which may be monaural or stereo. The greatest benefits of this invention, however, are in stereophonic reproduction.

Optimum positioning of the speakers on each side of the head is necessary to achieve what is called a Total Stereo spacial listening effect. The audio dispersion characteristics of the cone type of speaker are such that if the speakers are located or positioned outside the locus of positions hereafter described, the desirable listening sensation of Total Stereo is lost.

Almost any speaker angle generally toward the listener would be acceptable if only very low frequencies were being heard. However since voices and music utilize a broad range of frequencies it becomes necessary to position the speakers accordingly. The listeners sensitivity to the audio vibrations in the high frequency range is important to his experiencing what we have called Total Stereo. It is these high frequencies that provide the crispness and transparency to the sound being reproduced. This being the case, the speakers must be positioned such that the listener can perceive the high frequencies. Only then can he experience Total Stereo.

In FIG. 4 the center lines of the speakers are shown intersecting at the angle $\theta$. This angle may vary from 0°, where the center lines will be parallel to each other, and 180°, where the speakers will be directly opposed to each other. The Total Stereo effect can be achieved at any angle within this range if the speakers are no more than 5" from the ears of the listener. However from the safety viewpoint the angle $\theta$ should approximate the angle illustrated in FIG. 4.

Figure 3:
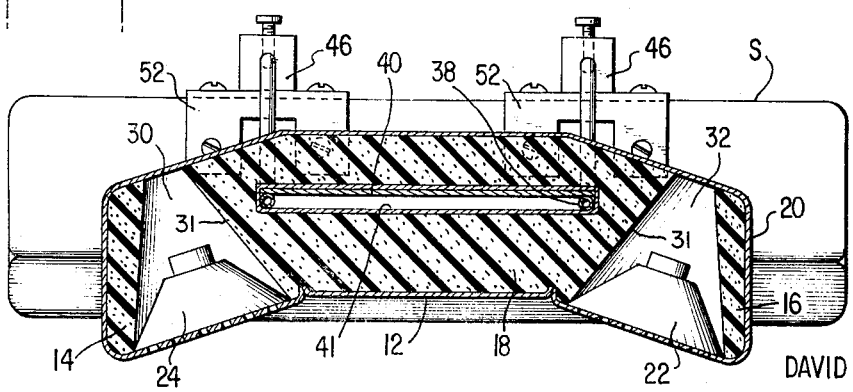
FIG. 3 is a sectional view taken along line 3—3 of FIG. 2.

The cover 20 has suitable openings or grills 26 and 28 in front of the speakers 22 and 24. Sound restricting means, such as acoustical chambers 30 and 32 are positioned behind the speakers. Alternatively, the padding 18 could be used as a mechanical restrictor of sound. As shown in FIG. 3, the padding 18 in the side wing portions may define the side walls 31 of the acoustical chambers.

Figure 2:
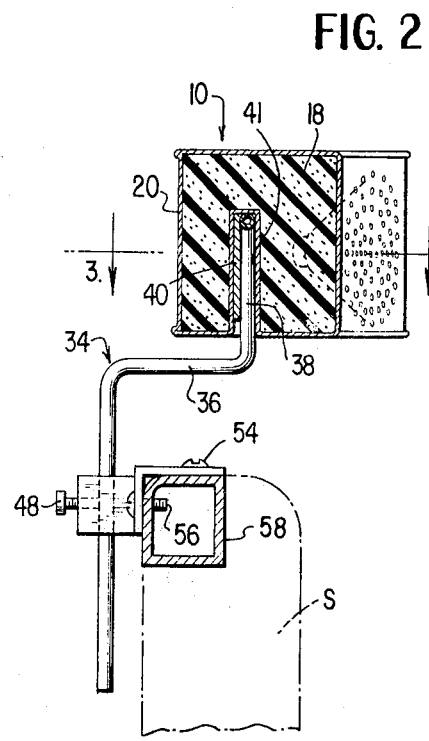
FIG. 2 is a vertical sectional view taken through the headrest and its mount onto an automobile seat.

In the preferred embodiment of FIGS. 1-3, the headrest 10 is mounted rigidly from seat S by means of a bracket assembly 34. This bracket assembly includes a bent tubular and/or solid member 36 having an upper portion 38 with a reinforcing plate 40 which is insertable into an elongated slot 41 extending upwardly from the bottom of the headrest 10. Thus the headrest can be quickly and easily removed from the bracket assembly 34 and used separately. The bracket tubular member 36 has lower tubular and/or solid legs 42, each of which is identical, so only one will be described. A mounting block 46 having vertical hole 44 mounts the leg 42 and the leg is held therein in adjusted position by set screw 48. A screw 50 from the mounting block 46 is threaded into an adapter bracket 52 which in turn is mounted by screws 54 and 56 from a rail 58 which is at the back top portion of most conventional automobile seats. With this arrangement the headrest 10 can be adjusted as desired and still will be rigid with regard to the seat. Additionally, the headrest 10 can be easily removed.

Referring to FIG. 4, the headrests 10 on each of the front seats are shown together with the angle of the speakers with regard to the head of a person seated in each front seat. In order to provide streophonic reproduction for the back seat, additional speakers 60 and 62 may be incorporated into the headrests 10. This greatly reduces the expense of mounting separate speakers in the body of the car.

FIG. 5 shows another embodiment wherein there are two speakers 64 and 66 on the back of the headrests at each front seat FS directed rearwardly toward the back seat BS. Note that the back surface of the headrest 10 is flat and not angled with the front surface of the wings of the headrest.

FIG. 6 shows a further embodiment for rigidly and adjustably mounting headrest 10. In this embodiment a pair of mounting posts 68 extend downwardly from the headrest 10 and are received through a solid rail 69 integral with the front seats FS. Notches 70 in posts 68 are selectively engaged by spring biased detent 72 having a head 74.

FIG. 8 is a further showing of an additional modification of this invention wherein a headrest construction in accordance with this invention may be integral with the top surface of a front seat S. This eliminates the need for supporting hardware and using the headrest as an accessory, since in such a case the headrest would be standard equipment being built with the seat.

While the invention has been particularly shown and described with reference to preferred embodiments thereof, it will be understood by those skilled in the art that the foregoing and other changes in form and details may be made therein without departing from the spirit and scope of the invention.

What is claimed is:
1. An automobile seat stereo speaker headrest comprising: a body having a central back portion and side wing portions having front walls extending outwardly and forwardly from the ends of the central back portion; impact absorbing padding in the interior of said back and side wing portions, an elongated slot in said central portion extending from the bottom surface thereof, a seat mounting bracket received in said slot for mounting said body on an automobile seat, a frusto-conical opening formed in each side wing portion and extending between the front and rear walls thereof with its large end located at the front wall of the respective side wing portion and its small end located at the rear wall thereof, said frusto-conical openings defining acoustical chambers, a plurality of openings in the front wall of each of said acoustical chambers, and an audio speaker mounted in the forward portion of each of said acoustical chambers such that the audio output from said speakers is directed forwardly and inwardly relative to the back portion.

2. An automobile seat stereo speaker headrest as claimed in claim 1 wherein said seat mounting bracket includes a tubular upper portion having a reinforcing plate mounted thereon, said upper portion being slidably received in said slot.

References Cited

UNITED STATES PATENTS

| 1,855,146 | 4/1932 | Jones | 181—0.5 |
| 1,864,615 | 6/1932 | Quinby | 179—146 |
| 2,807,313 | 9/1957 | Kaufman | 297—396 XR |
| 3,156,500 | 11/1964 | Kerr | 297—391 |
| 3,205,005 | 9/1965 | Brown | 297—397 |
| 3,290,450 | 12/1966 | Majoros | 179—146 |
| 3,303,279 | 2/1967 | Tinklepaugh | 178—5.8 |
| 3,337,268 | 8/1967 | Belk | 297—400 |
| 3,353,625 | 11/1967 | Scanlon | 181—31 |
| 3,416,804 | 12/1968 | Christie | 274—2 |
| 3,384,719 | 5/1968 | Lanzara | 179—146 |

FOREIGN PATENTS

| 1,014,167 | 8/1957 | Germany. |

STEPHEN J. TOMSKY, Primary Examiner

U.S. Cl. X.R.

179—146; 297—397